US012627654B2

(12) United States Patent
Cui et al.

(10) Patent No.: US 12,627,654 B2
(45) Date of Patent: May 12, 2026

(54) VIRTUAL DESKTOP SCREEN SHARING WITH MULTIPLE SHARERS IN A COLLABORATION SESSION

(71) Applicant: CITRIX SYSTEMS, INC., Fort Lauderdale, FL (US)

(72) Inventors: Kai Cui, Jiang Su (CN); Yuan Zhang, Jiang Su (CN); Muhammad Dawood, High Wycombe (GB); Zhen Fan, Jiangsu (CN)

( * ) Notice: Subject to any disclaimer, the term of this patent is extended or adjusted under 35 U.S.C. 154(b) by 342 days.

(21) Appl. No.: 17/811,330

(22) Filed: Jul. 8, 2022

(65) Prior Publication Data

US 2023/0403266 A1 Dec. 14, 2023

Related U.S. Application Data

(63) Continuation of application No. PCT/CN2022/098595, filed on Jun. 14, 2022.

(51) Int. Cl.
*H04L 65/401* (2022.01)
*G06F 9/451* (2018.01)
*H04L 9/40* (2022.01)

(52) U.S. Cl.
CPC .......... *H04L 63/0853* (2013.01); *G06F 9/452* (2018.02); *H04L 65/401* (2022.05)

(58) Field of Classification Search
None
See application file for complete search history.

(56) References Cited

U.S. PATENT DOCUMENTS

| | | | | |
|---|---|---|---|---|
| 2009/0228808 A1* | 9/2009 | MacDonald | ........ | H04L 12/1818 715/756 |
| 2012/0284335 A1* | 11/2012 | Chung | .................. | H04W 12/02 709/204 |
| 2019/0068390 A1* | 2/2019 | Gross | .................. | H04L 12/1827 |
| 2019/0155627 A1* | 5/2019 | Furuichi | ............. | G06F 9/45558 |
| 2019/0230165 A1* | 7/2019 | Wang | .................... | G06F 3/0481 |
| 2020/0228606 A1* | 7/2020 | San | ........................ | H04L 65/403 |
| 2023/0099137 A1* | 3/2023 | Yamada | .............. | H04L 65/1083 345/1.2 |
| 2023/0176880 A1* | 6/2023 | Baccala | .................. | G06F 9/452 370/260 |
| 2023/0261886 A1* | 8/2023 | Ha | .......................... | G06F 21/64 713/176 |

* cited by examiner

*Primary Examiner* — Joshua Joo

(57) ABSTRACT

A computing system includes a virtual server providing first and second virtual desktops. A first client computing device accesses the first virtual desktop via a communications network, and shares content of the first virtual desktop as a screen sharer in a collaboration session. A second client computing device accesses the second virtual desktop via the communications network, and displays content of the second virtual desktop in a virtual desktop window. The second client computing device participates in the collaboration session as a screen viewer, and receives the shared screen content of the first virtual desktop. The shared screen content is displayed by the second client computing device in a shared screen window, with the shared screen window being separate from the virtual desktop window.

16 Claims, 12 Drawing Sheets

VIRTUAL DESKTOP SCREEN SHARING WITH MULTIPLE SHARERS IN A COLLABORATION SESSION

RELATED APPLICATIONS

This application is a continuation of PCT application serial no. PCT/CN2022/098595 filed Jun. 14, 2022, which is hereby incorporated herein in its entirety by reference.

TECHNICAL FIELD

The present disclosure relates to computing systems, and more particularly, to a computing system with multiple users in a collaboration session sharing content of their virtual desktops at the same time.

BACKGROUND

Many organizations are now using application and/or desktop virtualization to provide a more flexible option to address the varying needs of their users. In desktop virtualization, a user's operating system, applications, and/or user settings may be separated from the user's physical smartphone, laptop, or desktop computer.

Using client-server technology, a virtualized desktop may be stored in and administered by a remote server, rather than in the local storage of a computing device. The computing device accesses the virtualized desktop in a remote computing session with the server. The remote computing session allows a user to access resources. The resources, for example, include SaaS and web apps, desktops, files and data. At times, a user may launch a collaboration app in order to share screen content of their virtual desktop with other users within the organization participating in a collaboration session.

SUMMARY

A computing system includes a virtual server that provides first and second virtual desktops. A first client computing device accesses the first virtual desktop via a communications network, and shares content of the first virtual desktop as a screen sharer in a collaboration session. A second client computing device accesses the second virtual desktop via the communications network, and displays content of the second virtual desktop in a virtual desktop window. The second client computing device participates in the collaboration session as a screen viewer, and receives the shared screen content of the first virtual desktop. The shared screen content is displayed in a shared screen window, with the shared screen window being separate from the virtual desktop window.

The first virtual desktop may be configured to bypass the second virtual desktop and provide the shared screen content directly to the second client computing device.

The first virtual desktop may be further configured to send an invitation to the second client computing device in response to a user of the first client computing device having selected to be the screen sharer, with the invitation including an address of the first client computing device and an authentication token.

The second virtual desktop may be configured to send a request to the first virtual desktop in response to the received invitation, with the request including an address of the second client computing device and the authentication token.

The first virtual desktop may be further configured to compare the authentication code in the request with the authentication code in the invitation, and in response to validation of the authentication code, deliver the shared screen content of the first virtual desktop to the second client computing device.

The second client computing device may be further configured to share content of the second virtual desktop as a screen sharer in the collaboration session while the user of the first client computing device is also the screen sharer.

The first client computing device may be configured to display content of the first virtual desktop in a virtual desktop window, and display the shared screen content of the second virtual desktop in a shared screen window. The shared screen window is separate from the virtual desktop window.

The second virtual desktop may be configured to bypass the first virtual desktop and provide the shared screen content of the second virtual desktop directly to the first client computing device.

The second virtual desktop may be further configured to send an invitation to the first client computing device in response to the user of the second client computing device having selected to be the screen sharer, with the invitation including an address of the second client computing device and an authentication token.

The first virtual desktop may be configured to send a request to the second virtual desktop in response to the received invitation, with the request including an address of the first client computing device and the authentication token.

The second virtual desktop may be further configured to compare the authentication code in the request with the authentication code in the invitation, and in response to validation of the authentication code, deliver the shared screen content of the second virtual desktop to the first client computing device.

The computing system may further include a third client computing device configured to access a third virtual desktop from the virtual server via the communication network. The third client computing device may be configured to display content of the third virtual desktop in a virtual desktop window, and participate in the collaboration session as a screen viewer. The third client computing device receives the shared screen content of the first virtual desktop, and the shared screen content of the second virtual desktop. The shared screen content of the first and second virtual desktops are displayed in separate shared screen windows, with each of the shared screen windows being separate from the virtual desktop window.

Another aspect is directed to a client computing device operating in the computing system as described above. The client computing device includes a display, and a processor coupled to the display. The processor may be configured to access a virtual desktop via a communications network, display content of the virtual desktop in a virtual desktop window, and participate in a collaboration session as a screen viewer in order to receive shared screen content of a second virtual desktop being accessed by a second client computing device participating in the collaboration session as a screen sharer. The shared screen content of the second virtual desktop is displayed in a shared screen window, with the shared screen window being separate from the virtual desktop window.

Yet another aspect is directed to a method for operating the client computing device as described above. The method includes accessing a virtual desktop via a communications network, and displaying content of the virtual desktop in a virtual desktop window. The client computing device participates in a collaboration session as a screen viewer in order to receive shared screen content of a second virtual desktop being accessed by a second client computing device participating in the collaboration session as a screen sharer. The shared screen content of the second virtual desktop is displayed in a shared screen window, with the shared screen window being separate from the virtual desktop window.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout, and prime notation is used to indicate similar elements in different embodiments.

Figure 1:
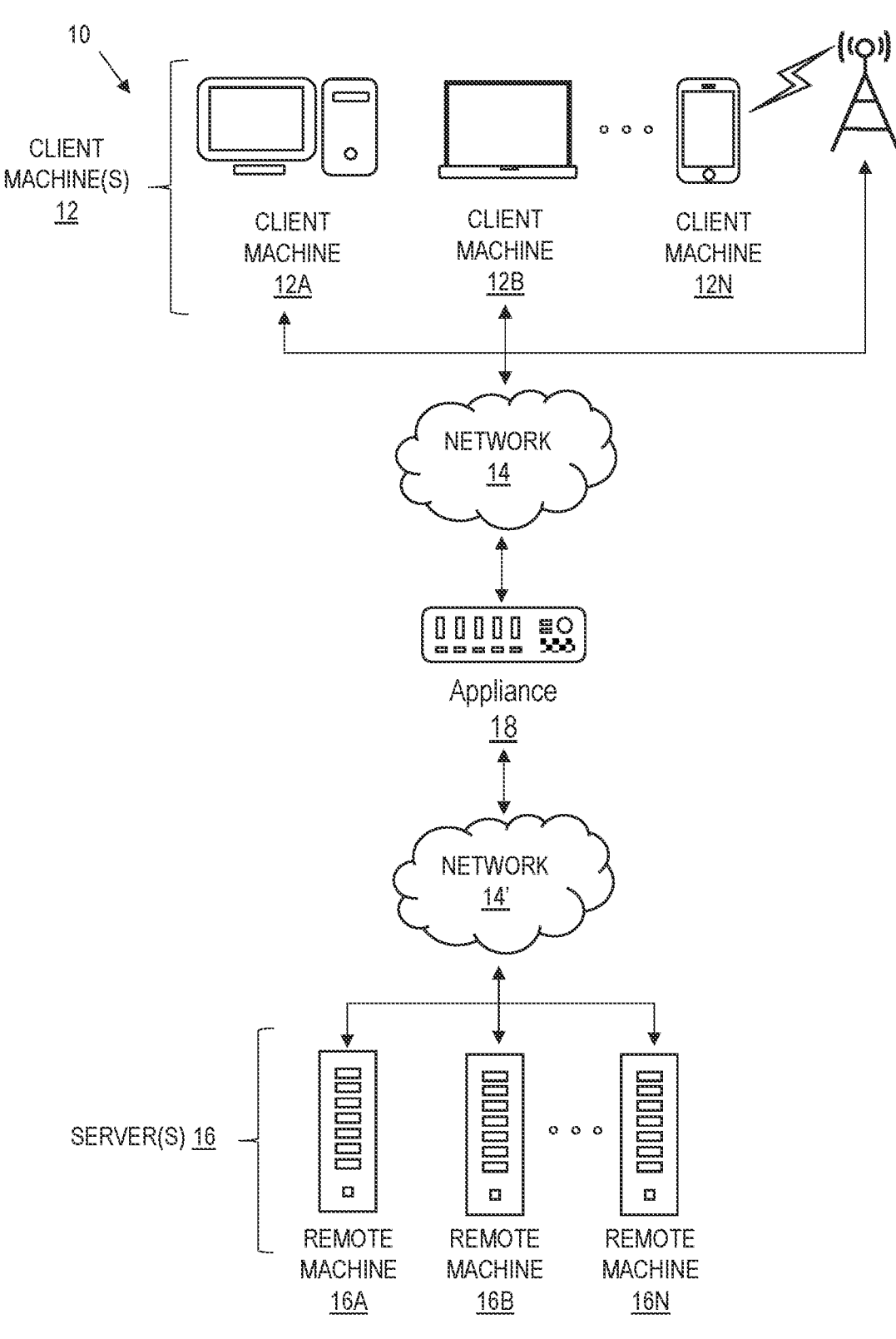
FIG. 1 is a schematic block diagram of a network environment of computing devices in which various aspects of the disclosure may be implemented.

Referring initially to FIG. 1, a non-limiting network environment 10 in which various aspects of the disclosure may be implemented includes one or more client machines 12A-12N, one or more remote machines 16A-16N, one or more networks 14, 14', and one or more appliances 18 installed within the computing environment 10. The client machines 12A-12N communicate with the remote machines 16A-16N via the networks 14, 14'. In some embodiments, the client machines 12A-12N communicate with the remote machines 16A-16N via an intermediary appliance 18. The illustrated appliance 18 is positioned between the networks 14, 14' and may also be referred to as a network interface or gateway. In some embodiments, the appliance 18 may operate as an application delivery controller (ADC) to provide clients with access to business applications and other data deployed in a data center, the cloud, or delivered as Software as a Service (SaaS) across a range of client devices, and/or provide other functionality such as load balancing, etc. In some embodiments, multiple appliances 18 may be used, and the appliance(s) 18 may be deployed as part of the network 14 and/or 14'.

The client machines 12A-12N may be generally referred to as client machines 12, local machines 12, clients 12, client nodes 12, client computers 12, client devices 12, computing devices 12, endpoints 12, or endpoint nodes 12. The remote machines 16A-16N may be generally referred to as servers 16 or a server farm 16. In some embodiments, a client device 12 may have the capacity to function as both a client node seeking access to resources provided by a server 16 and as a server 16 providing access to hosted resources for other client devices 12A-12N. The networks 14, 14' may be generally referred to as a network 14. The networks 14 may be configured in any combination of wired and wireless networks.

A server 16 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 16 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 16 may execute a remote presentation services program or other program that uses a thin-client or a remote-display protocol to capture display output generated by an application executing on a server 16 and transmit the application display output to a client device 12.

In yet other embodiments, a server 16 may execute a virtual machine providing, to a user of a client device 12, access to a computing environment. The client device 12 may be a virtual machine. The virtual machine may be managed by, for example, a hypervisor, a virtual machine manager (VMM), or any other hardware virtualization technique within the server 16.

In some embodiments, the network 14 may be: a local-area network (LAN); a metropolitan area network (MAN); a wide area network (WAN); a primary public network 14; and a primary private network 14. Additional embodiments may include a network 14 of mobile telephone networks that use various protocols to communicate among mobile devices. For short range communications within a wireless local-area network (WLAN), the protocols may include 802.11, Bluetooth, and Near Field Communication (NFC).

Figure 2:
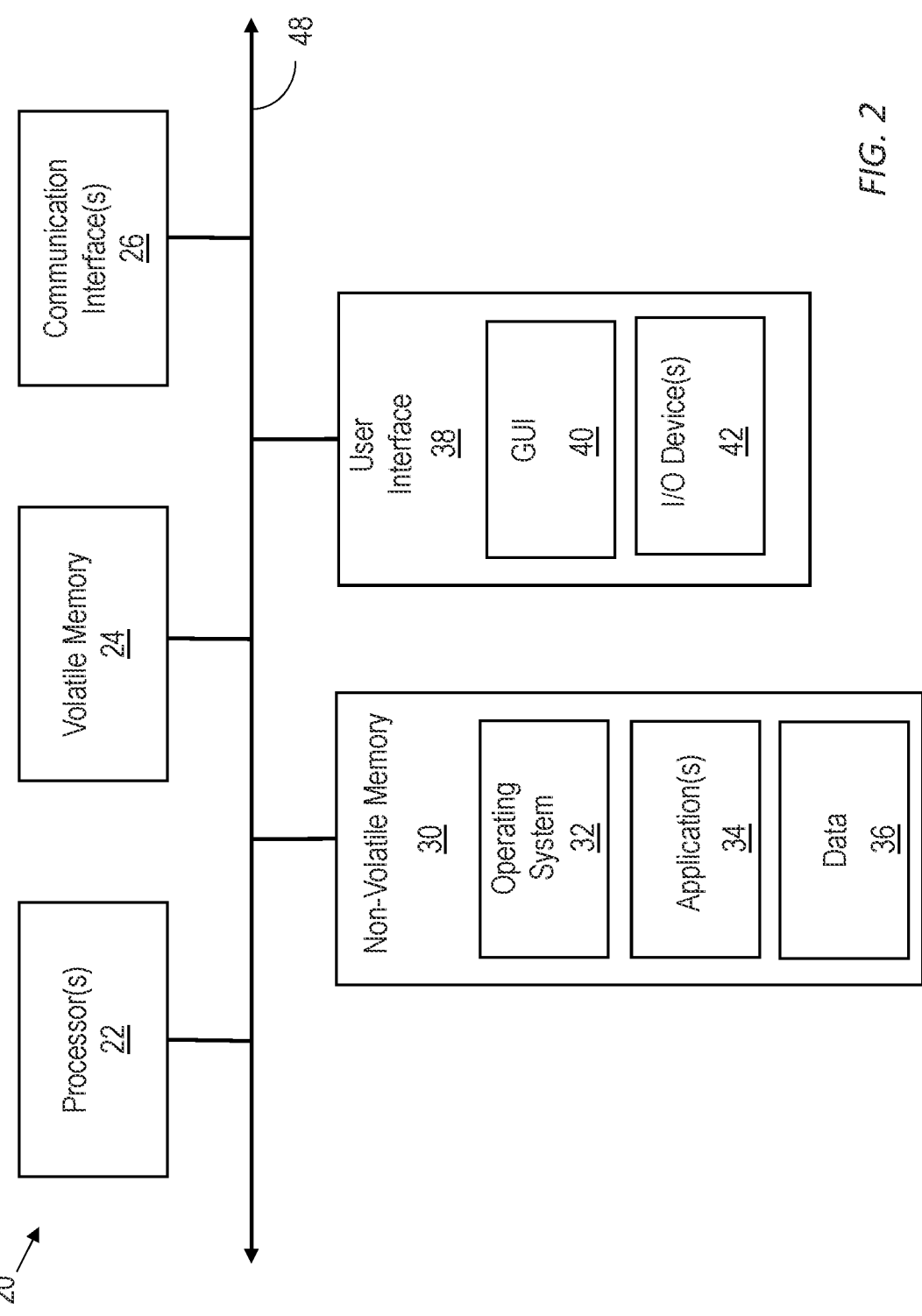
FIG. 2 is a schematic block diagram of a computing device useful for practicing an embodiment of the client machines or the remote machines illustrated in FIG. 1.

FIG. 2 depicts a block diagram of a computing device 20 useful for practicing an embodiment of client devices 12, appliances 18 and/or servers 16. The computing device 20 includes one or more processors 22, volatile memory 24 (e.g., random access memory (RAM)), non-volatile memory 30, user interface (UI) 38, one or more communications interfaces 26, and a communications bus 48.

The non-volatile memory 30 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 38 may include a graphical user interface (GUI) 40 (e.g., a touchscreen, a display, etc.) and one or more input/output (I/O) devices 42 (e.g., a mouse, a keyboard, a microphone, one or more speakers, one or more cameras, one or more biometric scanners, one or more environmental sensors, and one or more accelerometers, etc.).

The non-volatile memory 30 stores an operating system 32, one or more applications 34, and data 36 such that, for example, computer instructions of the operating system 32 and/or the applications 34 are executed by processor(s) 22 out of the volatile memory 24. In some embodiments, the volatile memory 24 may include one or more types of RAM and/or a cache memory that may offer a faster response time than a main memory. Data may be entered using an input device of the GUI 40 or received from the I/O device(s) 42. Various elements of the computer 20 may communicate via the communications bus 48.

The illustrated computing device 20 is shown merely as an example client device or server, and may be implemented by any computing or processing environment with any type of machine or set of machines that may have suitable hardware and/or software capable of operating as described herein.

The processor(s) 22 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 22 may be analog, digital or mixed-signal. In some embodiments, the processor 22 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 26 may include one or more interfaces to enable the computing device 20 to access a computer network such as a Local Area Network (LAN), a Wide Area Network (WAN), a Personal Area Network (PAN), or the Internet through a variety of wired and/or wireless connections, including cellular connections.

In described embodiments, the computing device 20 may execute an application on behalf of a user of a client device. For example, the computing device 20 may execute one or more virtual machines managed by a hypervisor. Each virtual machine may provide an execution session within which applications execute on behalf of a user or a client device, such as a hosted desktop session. The computing device 20 may also execute a terminal services session to provide a hosted desktop environment. The computing device 20 may provide access to a remote computing environment including one or more applications, one or more desktop applications, and one or more desktop sessions in which one or more applications may execute.

An example virtualization server 16 may be implemented using Citrix Hypervisor provided by Citrix Systems, Inc., of Fort Lauderdale, Florida ("Citrix Systems"). Virtual app and desktop sessions may further be provided by Citrix Virtual Apps and Desktops (CVAD), also from Citrix Systems. Citrix Virtual Apps and Desktops is an application virtualization solution that enhances productivity with universal access to virtual sessions including virtual app, desktop, and data sessions from any device, plus the option to implement a scalable VDI solution. Virtual sessions may further include Software as a Service (SaaS) and Desktop as a Service (DaaS) sessions, for example.

Figure 3:
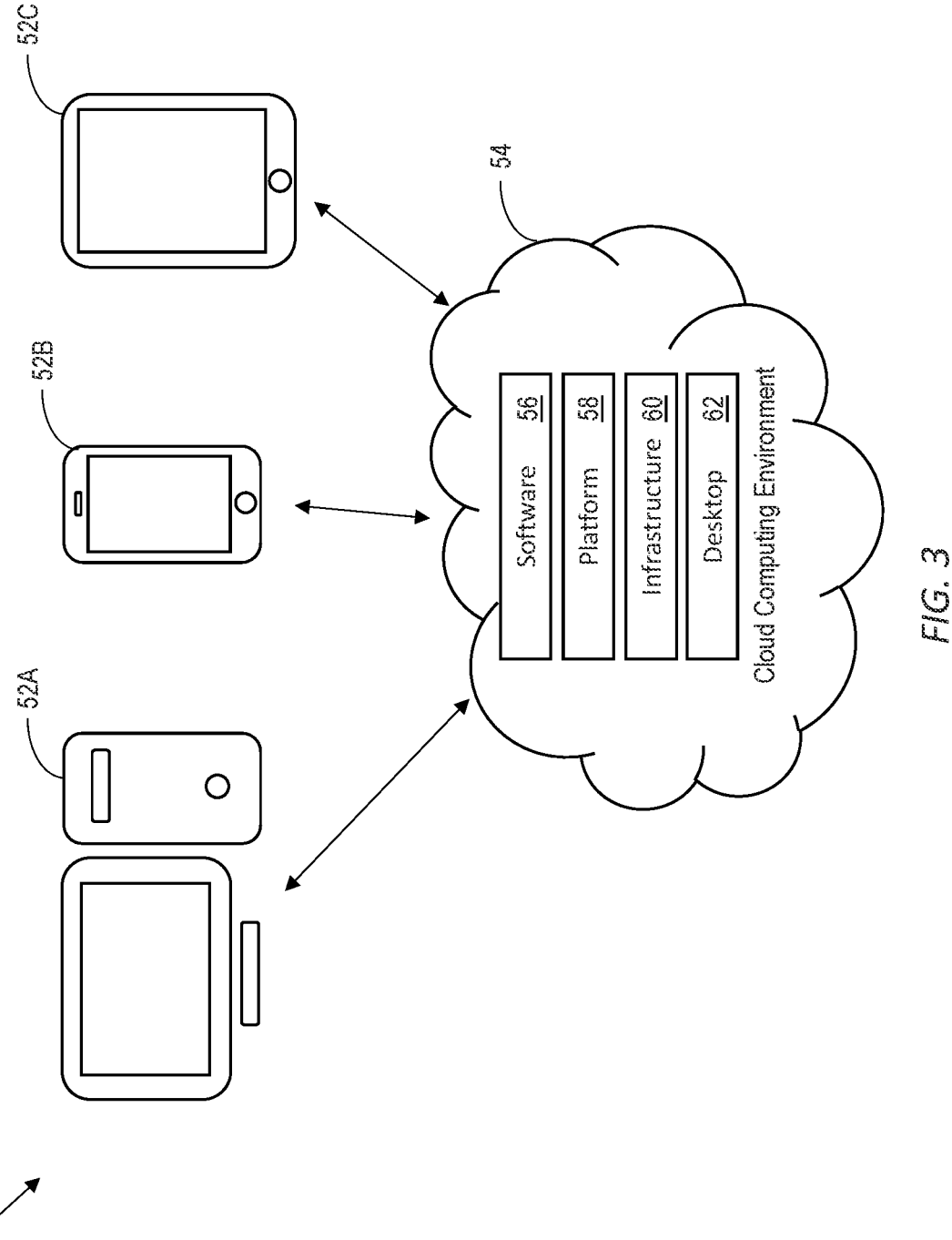
FIG. 3 is a schematic block diagram of a cloud computing environment in which various aspects of the disclosure may be implemented.

Referring to FIG. 3, a cloud computing environment 50 is depicted, which may also be referred to as a cloud environment, cloud computing or cloud network. The cloud computing environment 50 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 50, one or more clients 52A-52C (such as those described above) are in communication with a cloud network 54. The cloud network 54 may include backend platforms, e.g., servers, storage, server farms or data centers. The users or clients 52A-52C can correspond to a single organization/tenant or multiple organizations/tenants. More particularly, in one example implementation the cloud computing environment 50 may provide a private cloud serving a single organization (e.g., enterprise cloud). In another example, the cloud computing environment 50 may provide a community or public cloud serving multiple organizations/tenants. In still further embodiments, the cloud computing environment 50 may provide a hybrid cloud that is a combination of a public cloud and a private cloud. Public clouds may include public servers that are maintained by third parties to the clients 52A-52C or the enterprise/tenant. The servers may be located off-site in remote geographical locations or otherwise.

The cloud computing environment 50 can provide resource pooling to serve multiple users via clients 52A-52C through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 50 can provide on-demand self-service to unilaterally provision computing capabilities (e.g., server time, network storage) across a network for multiple clients 52A-52C. The cloud computing environment 50 can provide an elasticity to dynamically scale out or scale in responsive to different demands from one or more clients 52. In some embodiments, the computing environment 50 can include or provide monitoring services to monitor, control and/or generate reports corresponding to the provided shared services and resources.

In some embodiments, the cloud computing environment may provide cloud-based delivery of different types of cloud computing services, such as Software as a service (SaaS) 56, Platform as a Service (PaaS) 58, Infrastructure as a Service (IaaS) 60, and Desktop as a Service (DaaS) 62, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTS-CALE provided by RightScale, Inc., of Santa Barbara, California.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft ONE-DRIVE provided by Microsoft Corporation, Google Drive provided by Google Inc., or Apple ICLOUD provided by Apple Inc. of Cupertino, California.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud is one example of a DaaS delivery platform. DaaS delivery platforms may be hosted on a public cloud computing infrastructure such as AZURE CLOUD from Microsoft Corporation of Redmond, Washington (herein "Azure"), or AMAZON WEB SERVICES provided by Amazon.com, Inc., of Seattle, Washington (herein "AWS"), for example. In the case of Citrix Cloud, Citrix Workspace app may be used as a single-entry point for bringing apps, files and desktops together (whether on-premises or in the cloud) to deliver a unified experience.

Figure 4:
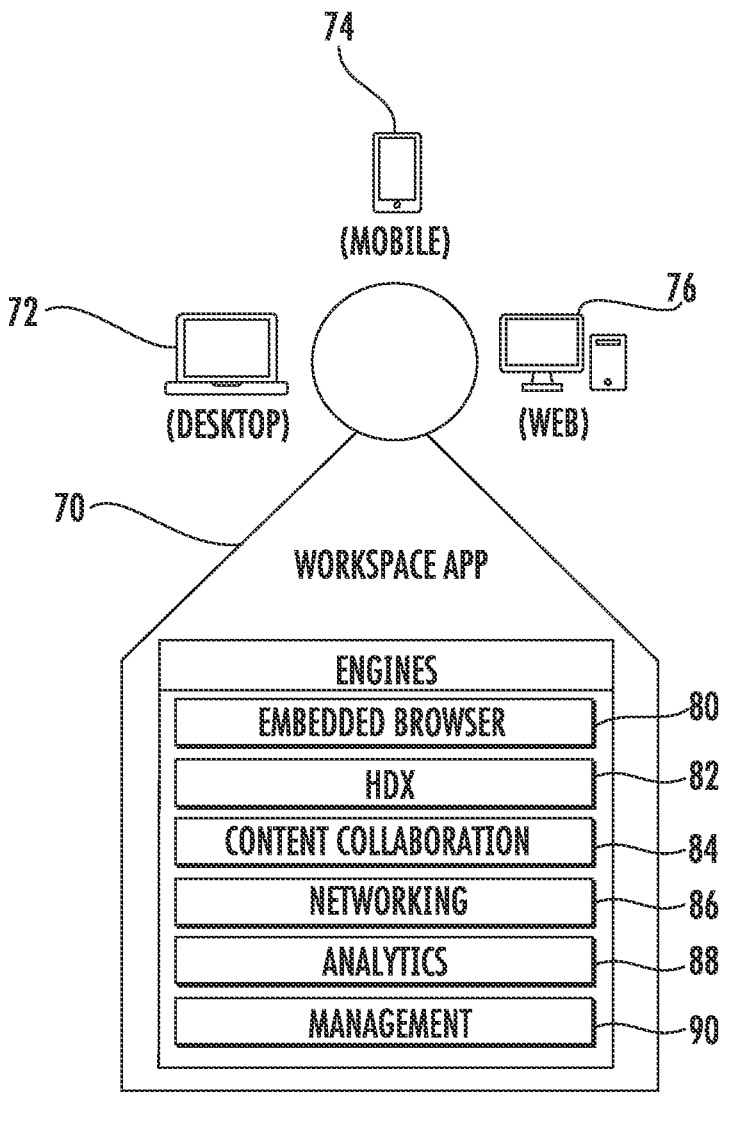
FIG. 4 is a schematic block diagram of desktop, mobile and web based devices operating a workspace app in which various aspects of the disclosure may be implemented.

The unified experience provided by the Citrix Workspace app will now be discussed in greater detail with reference to FIG. 4. The Citrix Workspace app will be generally referred to herein as the workspace app 70. The workspace app 70 is how a user gets access to their workspace resources, one category of which is applications. These applications can be SaaS apps, web apps or virtual apps. The workspace app 70 also gives users access to their desktops, which may be a local desktop or a virtual desktop. Further, the workspace app 70 gives users access to their files and data, which may be stored in numerous repositories. The files and data may be hosted on Citrix ShareFile, hosted on an on-premises network file server, or hosted in some other cloud storage provider, such as Microsoft OneDrive or Google Drive Box, for example.

To provide a unified experience, all of the resources a user requires may be located and accessible from the workspace app 70. The workspace app 70 is provided in different versions. One version of the workspace app 70 is an installed application for desktops 72, which may be based on Windows, Mac or Linux platforms. A second version of the workspace app 70 is an installed application for mobile devices 74, which may be based on iOS or Android platforms. A third version of the workspace app 70 uses a hypertext markup language (HTML) browser to provide a user access to their workspace environment. The web version of the workspace app 70 is used when a user does not want to install the workspace app or does not have the rights to install the workspace app, such as when operating a public kiosk 76.

Each of these different versions of the workspace app may advantageously provide the same user experience. This advantageously allows a user to move from client device 72 to client device 74 to client device 76 in different platforms and still receive the same user experience for their workspace. The client devices 72, 74 and 76 are referred to as endpoints.

As noted above, the workspace app 70 supports Windows, Mac, Linux, iOS, and Android platforms as well as platforms with an HTML browser (HTML5). The workspace app 70 incorporates multiple engines 80-90 allowing users access to numerous types of app and data resources. Each engine 80-90 optimizes the user experience for a particular resource. Each engine 80-90 also provides an organization or enterprise with insights into user activities and potential security threats.

An embedded browser engine 80 keeps SaaS and web apps contained within the workspace app 70 instead of launching them on a locally installed and unmanaged browser. With the embedded browser, the workspace app 70 is able to intercept user-selected hyperlinks in SaaS and web apps and request a risk analysis before approving, denying, or isolating access.

A high definition experience (HDX) engine 82 establishes connections to virtual browsers, virtual apps and desktop sessions running on either Windows or Linux operating systems. With the HDX engine 82, Windows and Linux resources run remotely, while the display remains local, on the endpoint. To provide the best possible user experience, the HDX engine 82 utilizes different virtual channels to adapt to changing network conditions and application requirements. To overcome high-latency or high-packet loss networks, the HDX engine 82 automatically implements optimized transport protocols and greater compression algorithms. Each algorithm is optimized for a certain type of display, such as video, images, or text. The HDX engine 82 identifies these types of resources in an application and applies the most appropriate algorithm to that section of the screen.

For many users, a workspace centers on data. A content collaboration engine 84 allows users to integrate all data into the workspace, whether that data lives on-premises or in the cloud. The content collaboration engine 84 allows administrators and users to create a set of connectors to corporate and user-specific data storage locations. This can include OneDrive, Dropbox, and on-premises network file shares, for example. Users can maintain files in multiple repositories and allow the workspace app 70 to consolidate them into a single, personalized library.

A networking engine 86 identifies whether or not an endpoint or an app on the endpoint requires network connectivity to a secured backend resource. The networking engine 86 can automatically establish a full VPN tunnel for the entire endpoint device, or it can create an app-specific p-VPN connection. A p-VPN defines what backend resources an application and an endpoint device can access, thus protecting the backend infrastructure. In many instances, certain user activities benefit from unique network-based optimizations. If the user requests a file copy, the workspace app 70 can automatically utilize multiple network connections simultaneously to complete the activity faster. If the user initiates a VoIP call, the workspace app 70 improves its quality by duplicating the call across multiple network connections. The networking engine 86 uses only the packets that arrive first.

An analytics engine 88 reports on the user's device, location and behavior, where cloud-based services identify any potential anomalies that might be the result of a stolen device, a hacked identity or a user who is preparing to leave the company. The information gathered by the analytics engine 88 protects company assets by automatically implementing counter-measures.

A management engine 90 keeps the workspace app 70 current. This not only provides users with the latest capabilities, but also includes extra security enhancements. The workspace app 70 includes an auto-update service that routinely checks and automatically deploys updates based on customizable policies.

Figure 5:
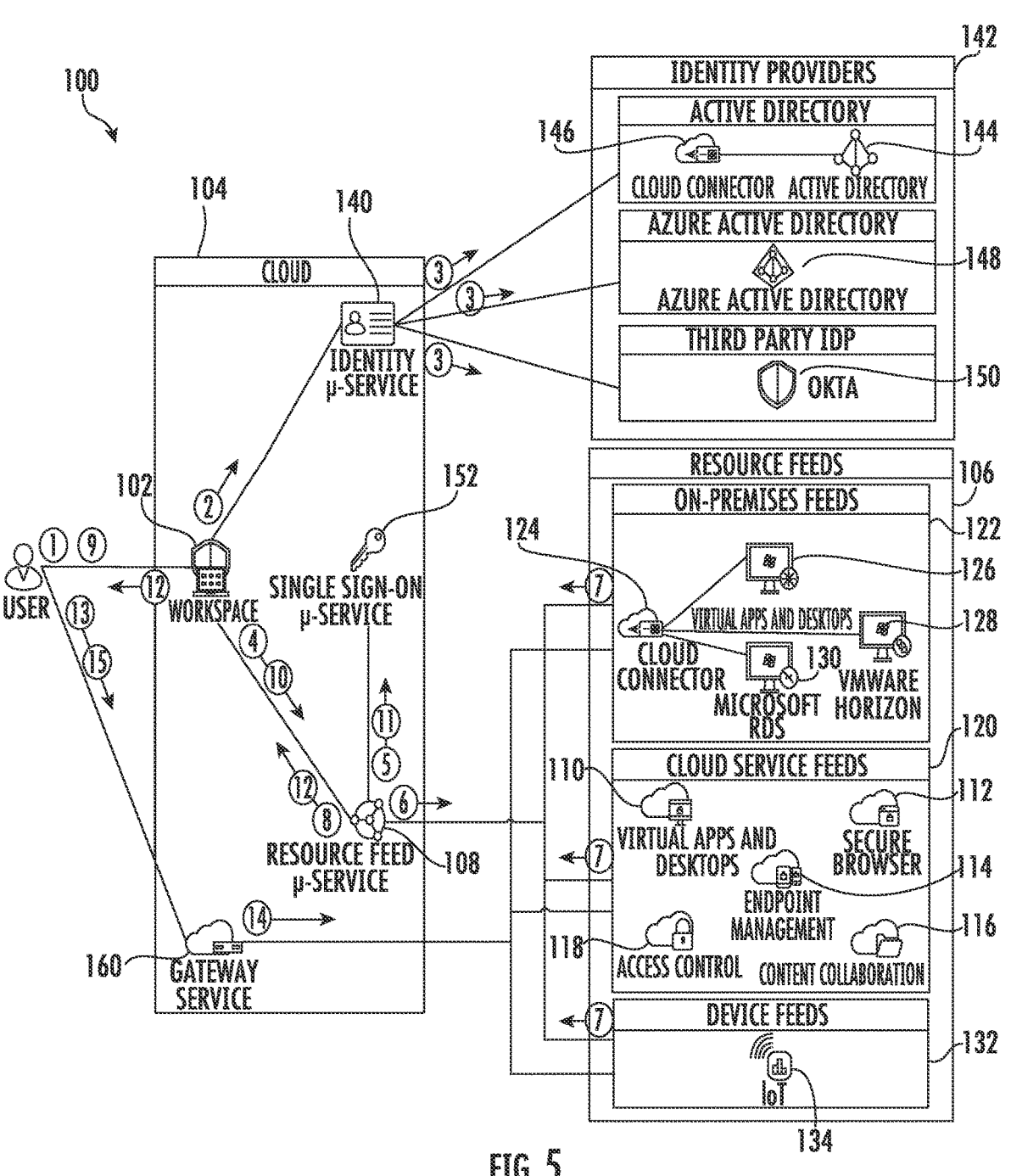
FIG. 5 is a schematic block diagram of a workspace network environment of computing devices in which various aspects of the disclosure may be implemented.

Referring now to FIG. 5, a workspace network environment 100 providing a unified experience to a user based on the workspace app 70 will be discussed. The desktop, mobile and web versions of the workspace app 70 all communicate with the workspace experience service 102 running within the Citrix Cloud 104. The workspace experience service 102 then pulls in all the different resource feeds via a resource feed micro-service 108. That is, all the different resources from other services running in the Citrix Cloud 104 are pulled in by the resource feed micro-service 108. The different services may include a virtual apps and desktop service 110, a secure browser service 112, an endpoint management service 114, a content collaboration service 116, and an access control service 118. Any service that an organization or enterprise subscribes to are automatically pulled into the workspace experience service 102 and delivered to the user's workspace app 70.

In addition to cloud feeds 120, the resource feed micro-service 108 can pull in on-premises feeds 122. A cloud connector 124 is used to provide virtual apps and desktop deployments that are running in an on-premises data center. Desktop virtualization may be provided by Citrix virtual apps and desktops 126, Microsoft RDS 128 or VMware Horizon 130, for example. In addition to cloud feeds 120 and on-premises feeds 122, device feeds 132 from Internet of Thing (IoT) devices 134, for example, may be pulled in by the resource feed micro-service 108. Site aggregation is used to tie the different resources into the user's overall workspace experience.

The cloud feeds 120, on-premises feeds 122 and device feeds 132 each provides the user's workspace experience with a different and unique type of application. The workspace experience can support local apps, SaaS apps, virtual apps, and desktops browser apps, as well as storage apps. As the feeds continue to increase and expand, the workspace experience is able to include additional resources in the user's overall workspace. This means a user will be able to get to every single application that they need access to.

Still referring to the workspace network environment a series of events will be described on how a unified experience is provided to a user. The unified experience starts with the user using the workspace app 70 to connect to the workspace experience service 102 running within the Citrix Cloud 104, and presenting their identity (event 1). The identity includes a user name and password, for example.

The workspace experience service 102 forwards the user's identity to an identity micro-service 140 within the Citrix Cloud 104 (event 2). The identity micro-service 140 authenticates the user to the correct identity provider 142 (event 3) based on the organization's workspace configuration. Authentication may be based on an on-premises active directory 144 that requires the deployment of a cloud connector 146. Authentication may also be based on Azure Active Directory 148 or even a third party identity provider 150, such as Citrix ADC or Okta, for example.

Once authorized, the workspace experience service 102 requests a list of authorized resources (event 4) from the resource feed micro-service 108. For each configured resource feed 106, the resource feed micro-service 108 requests an identity token (event 5) from the single-sign micro-service 152.

The resource feed specific identity token is passed to each resource's point of authentication (event 6). On-premises resources 122 are contacted through the Citrix Cloud Connector 124. Each resource feed 106 replies with a list of resources authorized for the respective identity (event 7).

The resource feed micro-service 108 aggregates all items from the different resource feeds 106 and forwards (event 8) to the workspace experience service 102. The user selects a resource from the workspace experience service 102 (event 9).

The workspace experience service 102 forwards the request to the resource feed micro-service 108 (event 10). The resource feed micro-service 108 requests an identity token from the single sign-on micro-service 152 (event 11). The user's identity token is sent to the workspace experience service 102 (event 12) where a launch ticket is generated and sent to the user.

The user initiates a secure session to a gateway service 160 and presents the launch ticket (event 13). The gateway service 160 initiates a secure session to the appropriate resource feed 106 and presents the identity token to seamlessly authenticate the user (event 14). Once the session initializes, the user is able to utilize the resource (event Having an entire workspace delivered through a single access point or application advantageously improves productivity and streamlines common workflows for the user.

Another aspect of the disclosure is directed to providing collaboration sessions for users within an organization or enterprise while accessing virtual desktops. Collaboration sessions provide screen sharing and video conferencing in real-time for the users. Example collaboration services include Microsoft (MS) Teams as provided by Microsoft, Webex as provided by Cisco, and GoToMeeting as provided by LogMeIn.

Current collaboration services only allow one user (i.e., a single screen sharer) at a time to share content of their virtual desktop to other users (i.e., multiple screen viewers). If multiple users want to share the content of their respective virtual desktops, then they have to switch between being a screen sharer and a screen viewer. The switching may be frequent if a back and forth discussion is going on between the two users.

The underlying reason for one screen sharer at a time is to prevent a hall of mirrors effect. The hall of mirrors effect occurs when a user is both a screen sharer and a screen viewer, which results in the user seeing its own screen content from the shared screen content of another user acting as a screen sharer.

Figure 6:
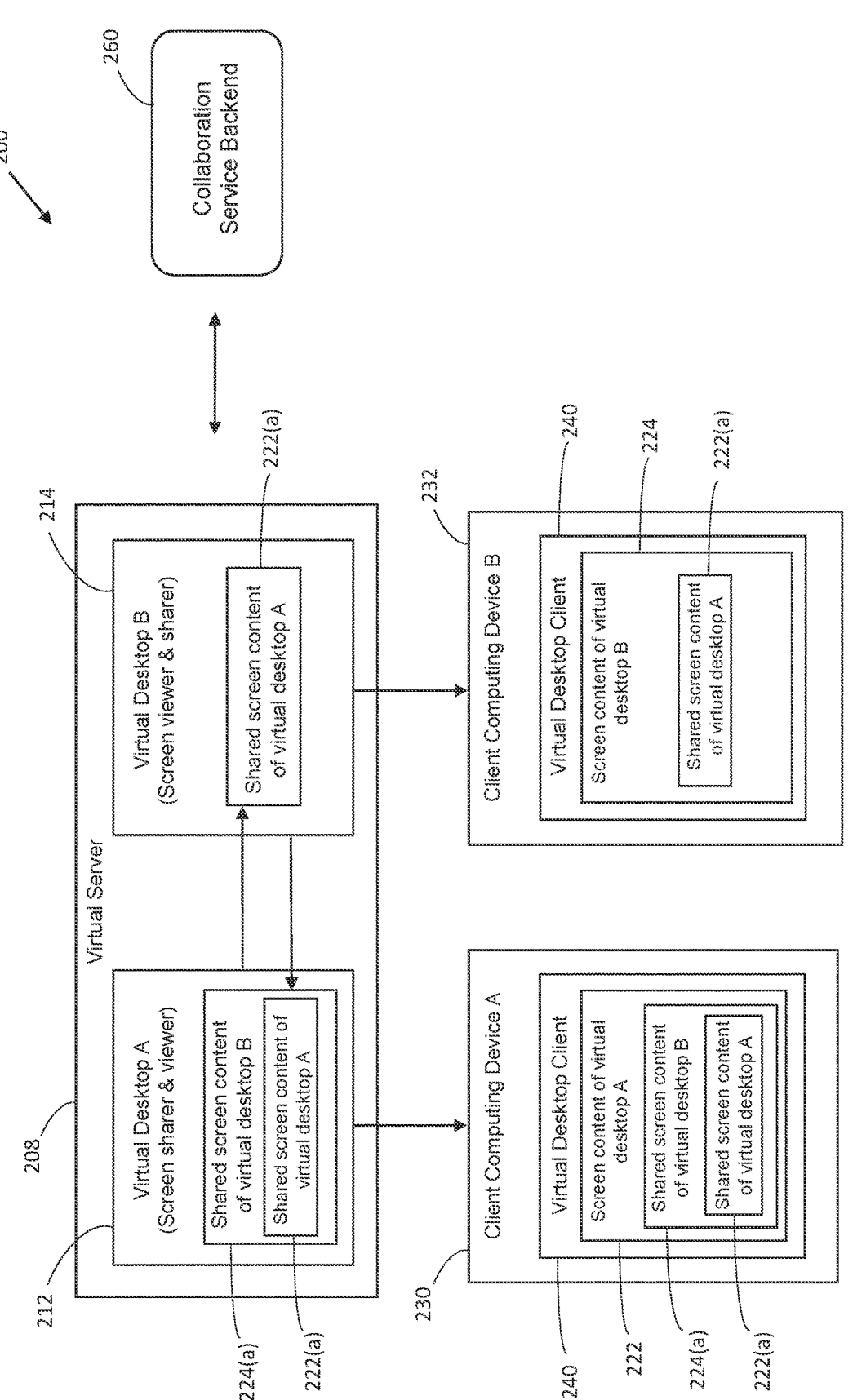
FIG. 6 is a schematic block diagram of a computing system illustrating a hall of mirrors effect with multiple screen sharers within a collaboration session.

Referring now to FIG. 6, a computing system 200 illustrating the hall of mirrors effect between multiple screen sharers within a collaboration session will be discussed. Client computing device A 230 is accessing virtual desktop A 212 and client computing device B 232 is accessing virtual desktop B 214 in a virtual server 208. The users of client computing device A 230 and client computing device B 232 have each launched a collaboration application in order to participate in a collaboration session. The virtual server 208 then interfaces with a collaboration service backend 260.

Virtual desktop A 212 has an initial role of a screen sharer, and virtual desktop B 214 has an initial ire role of a screen viewer. Client computing device A 230 includes a virtual desktop client 240 to receive content 222 of virtual desktop A 212 for display. Client computing device B 232 includes a virtual desktop client 240 to receive content 224 of virtual desktop B 232 for display. Each of the users of client computing device A 230 and B 232 can initiate screen sharing from their corresponding computing device.

In the collaboration session, the screen content 222 of virtual desktop A 212 is provided as shared screen content 222(a) from virtual desktop A 212 to virtual desktop B 214 via the virtual server 208. The shared screen content 222(a) is then provided from virtual desktop B 214 to the virtual desktop client 240 within client computing device B 232 to be displayed within the screen content 224 of virtual desktop B 214.

In response to virtual desktop B 214 becoming a screen sharer and virtual desktop A 212 becoming a screen viewer, the screen content 224 of virtual desktop B 214 is to be shared with the user of client computing device A 212 as shared screen content 224(a).

In this case, the shared screen content 224(a) is provided from virtual desktop B 214 to virtual desktop A 212 via the virtual server 208. The screen content 222 of virtual desktop A 212 now includes the shared screen content 224(a) of virtual desktop B 214 which in turn includes the shared screen content 222(a) of virtual desktop A 212. Consequently, the hall of mirror effect occurs when the screen content of virtual desktop A 212 is repeated (i.e., screen content 222 and shared screen content 222(a)) to the user of client computing device A 230.

To address the hall of mirrors effect in a collaboration session, a user accessing a virtual desktop needs to view shared screen content from other virtual desktops while sharing screen content of its own virtual desktop without any interference. As will be discussed in greater detail below, display of content of the shared screen is separated from display of content of the virtual desktop. As a result, the screen viewer is able to share screen content of its virtual desktop without any interference from display of the shared screen content.

Figure 7:
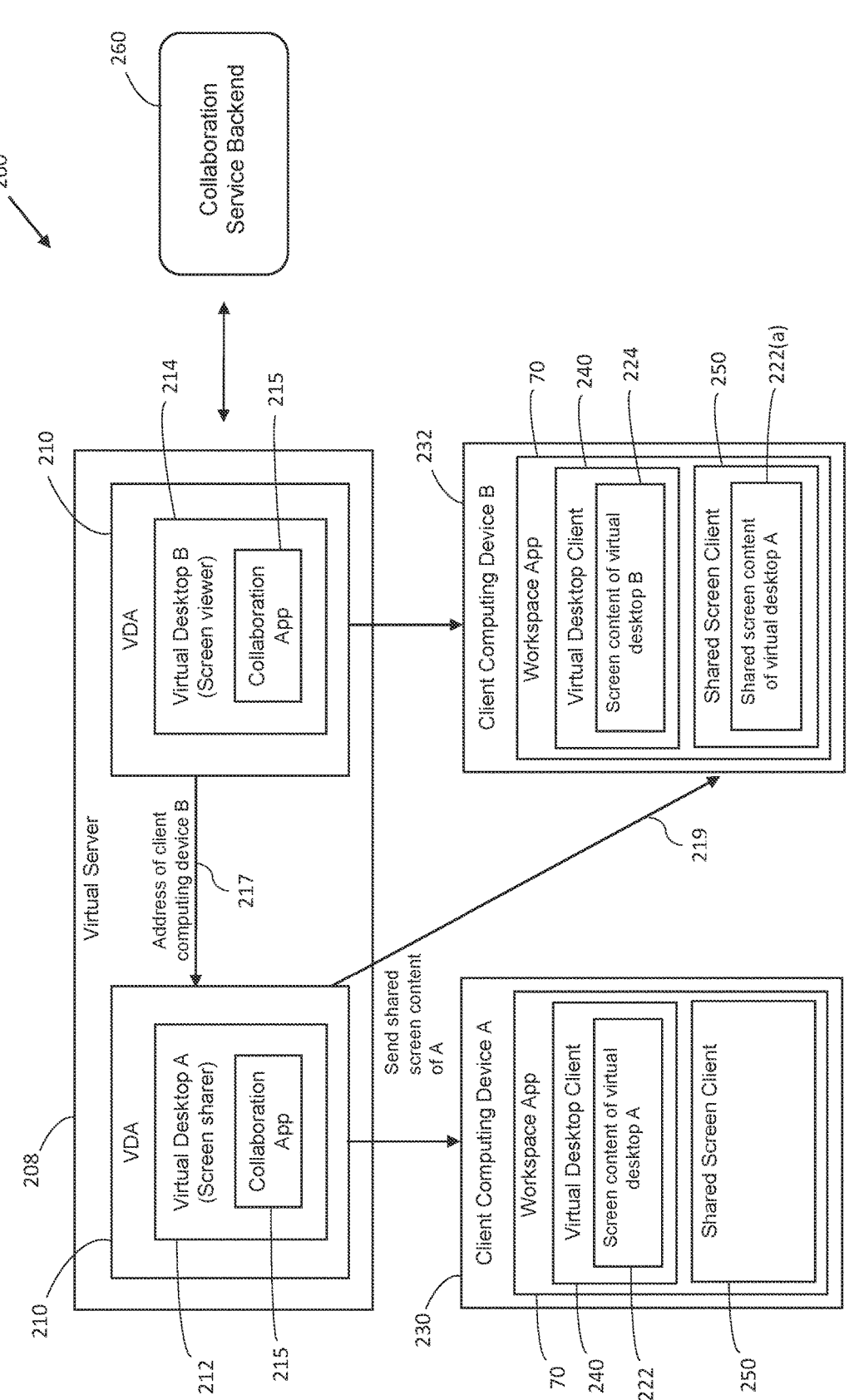
FIG. 7 is a schematic block diagram of a computing system preventing the hall of mirrors effect in FIG. 6 according to aspects of the disclosure.

Referring now to FIG. 7, modifications to the computing system 200 to prevent the hall of mirrors effect in a collaboration session will now be discussed. A collaboration app 215 is launched to provide the collaboration session between the user of client computing device A 230 and the user of client computing device B 232. Client computing device A 230 may also be referred to as a first client computing device, and client computing device B 232 may also be referred to as a second client computing device.

The collaboration app 215 operates independently of the above referenced collaboration services. Operation of the collaboration app 215 between a screen sharer 302 and a screen viewer 304 will also be discussed in reference to the sequence diagram 300 illustrated in FIG. 8.

As part of the collaboration app 215, each user has the choice to be a screen sharer 302 or a screen viewer 304. The collaboration app 215 requires each user to make a selection in order to participate in the collaboration session. There is no automatic participation when a user launches the collaboration app 215.

Figure 8:
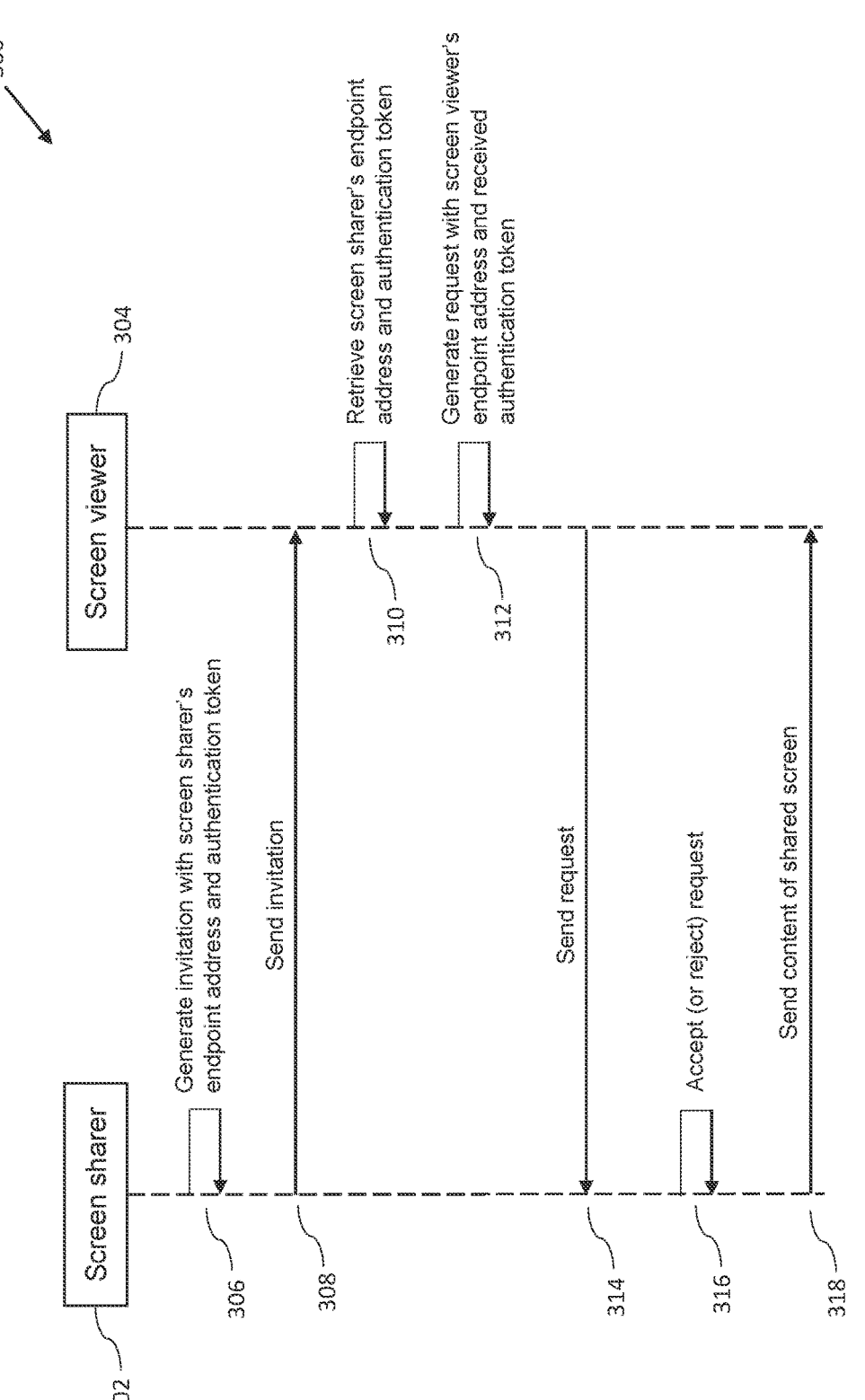
FIG. 8 is a sequence diagram on screen sharing between a screen sharer and a screen viewer for the computing system illustrated in FIG. 7

In response to the user of client computing device A 230 selecting to be a screen sharer 302, an invitation (e.g., an invitation code) is generated by virtual desktop A 212 at line 306 in FIG. 8. The invitation includes an endpoint address of client computing device A 230 and an authentication token. As an example, the endpoint address includes an IP address assigned to client computing device A 230, and a port number that identifies the location within client computing device A 230 that is to receive data.

The invitation is then sent to the screen viewer 304 at line 308. The invitation may be sent within the collaboration app 215, via email or a messaging app, for example. In response to the user of client computing device B 232 requesting to be a screen viewer 304, virtual desktop B 214 retrieves the endpoint address and authentication token from the invitation at line 310.

Virtual desktop B 214 then generates a request (e.g., a request code) at line 312. The request includes an endpoint address of client computing device B 232 and the authentication token received in the invitation. The request is sent from virtual desktop B 214 to virtual desktop A 212 at line 314. This corresponds to line 217 in FIG. 7.

Virtual desktop A 212 compares the authentication code in the request with the authentication code in the invitation at line 316 for a match. In response to a validation (i.e., a match) of the authentication codes, virtual desktop A 212 accepts the request at line 316. The request would be rejected by virtual desktop A 212 if there was not a match between the authentication codes.

The shared screen content 222(a) of virtual desktop A 212 is sent to the screen viewer 304 at line 318. This corresponds to line 219 in FIG. 7. The shared screen content 222(a) bypasses virtual desktop B 214 and is sent directly to the endpoint address of client computing device B 232.

At client computing device B 232, the shared screen content 222(a) of virtual desktop A 212 is received by a shared screen client 250. The shared screen client 250 is independent from the virtual desktop client 240. The function of the shared screen client 250 is to display shared screen content, whereas the function of the virtual desktop client 240 is to display content of a virtual desktop.

Both the shared screen client 250 and the virtual desktop client 240 are within the workspace app 70. As discussed above, the workspace app 70 is how a user gets access to their workspace resources within an organization. The shared screen content received by the shared screen client 250 is independent of the virtual desktop client 240. The shared screen client 250 and the virtual desktop client 240 perform client-side processing based on interfacing with the virtual server 208.

The shared screen content 222(*a*) of virtual desktop A 212 is displayed in a window that is separate from a window that displays the screen content 224 of virtual desktop B 214. Since separate windows are used for the shared screen content and the screen content of a virtual desktop, the hall of mirrors is prevented.

Figure 9:
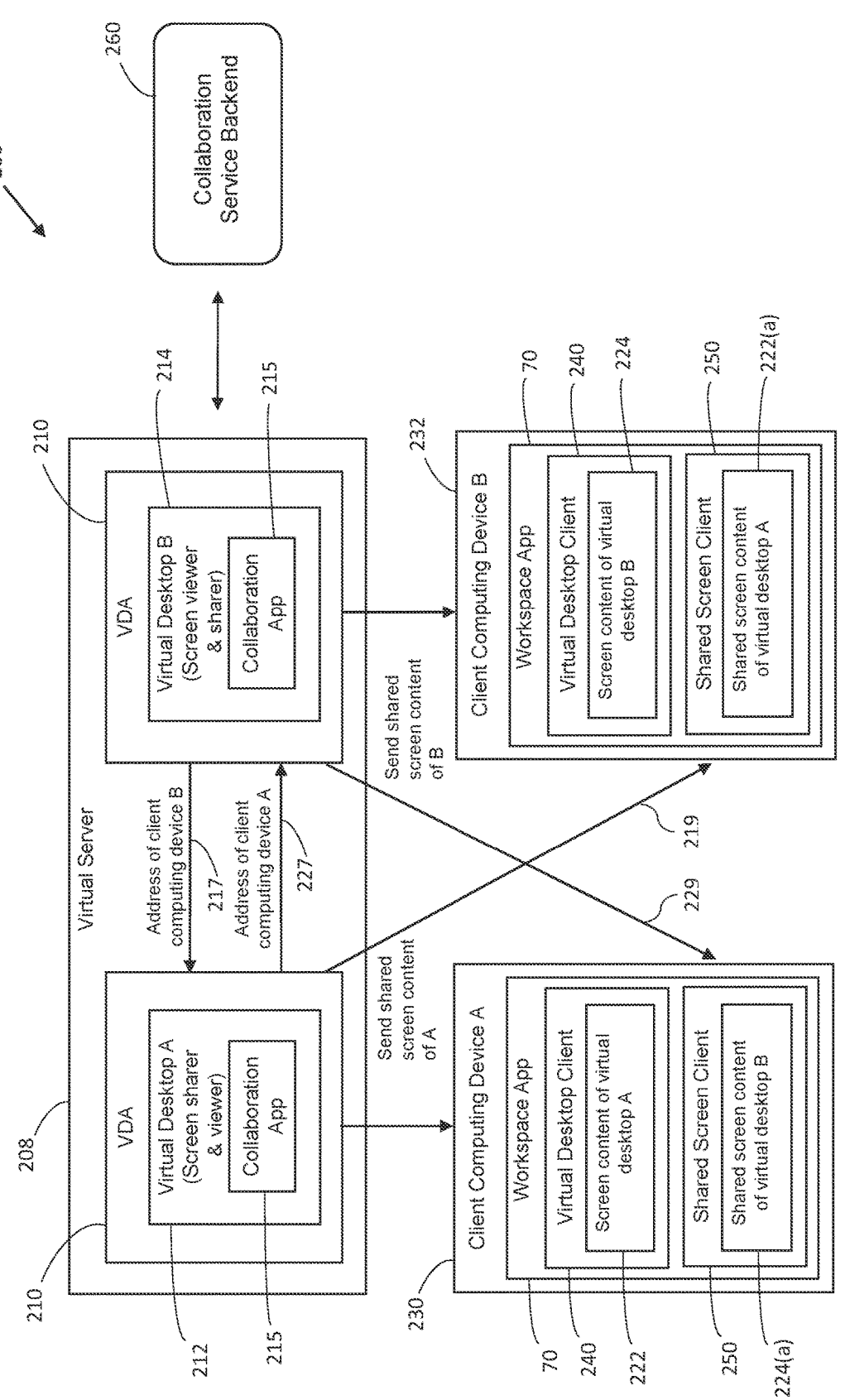
FIG. 9 is a schematic block diagram of the computing system illustrated in FIG. 7 with multiple screen sharers.

Referring now to FIG. 9, the user of client computing device A 230 as a screen sharer and a screen viewer, and the user of client computing device B 232 as a screen viewer and a screen sharer will be discussed.

First, computing device A 230 is the screen sharer 302 and computing device B 232 is the screen viewer 304. In this setting, the endpoint address of client computing device B 232 is sent from virtual desktop B 214 to virtual desktop A 212 as indicated by line 217. The shared screen content 222(*a*) of virtual desktop A 212 is sent directly to the endpoint address of client computing device B 232 as indicated by line 219. The screen content of virtual desktop B 214 is displayed in a separate window from the shared screen content 222(*a*) of virtual desktop A 212.

Second, computing device B 232 is now the screen sharer 302 and computing device A 230 is the screen viewer 304. As described above, in response to the user of client computing device B 232 selecting to be a screen sharer 302, an invitation is sent to the screen viewer 304. The invitation includes an endpoint address of client computing device B 232 and an authentication token.

In response to the user of client computing device A 230 selecting to be the screen viewer 304, virtual desktop A 212 sends a request to virtual desktop B 214 as indicated by line 227. The request includes an endpoint address of client computing device A 230 and the authentication token received in the invitation.

In response to validation of the authentication code by virtual desktop B 214, the shared screen content 224(*a*) of virtual desktop B 214 is sent to client computing device A 232 as indicated by line 229. The shared screen content 224(*a*) bypasses virtual desktop A 212 and is sent directly to the endpoint address of client computing device B 232.

At client computing device A 230, the shared screen content 224(*a*) of virtual desktop B 214 is received by the shared screen client 250. Since the shared screen client 250 is independent from the virtual desktop client 240, the screen viewer 304 is able to share screen content of its virtual desktop without any interference from display of the shared screen content.

Content 222 of virtual desktop A 212 and content 224 of virtual desktop B 214 does not interfere with their respective shared screen content 222(*a*) and 224(*a*). As a result, virtual desktop A 212 and virtual desktop B 214 (both a sharer and viewer) would not see its own respective screen content from the shared screen display.

Figure 10:
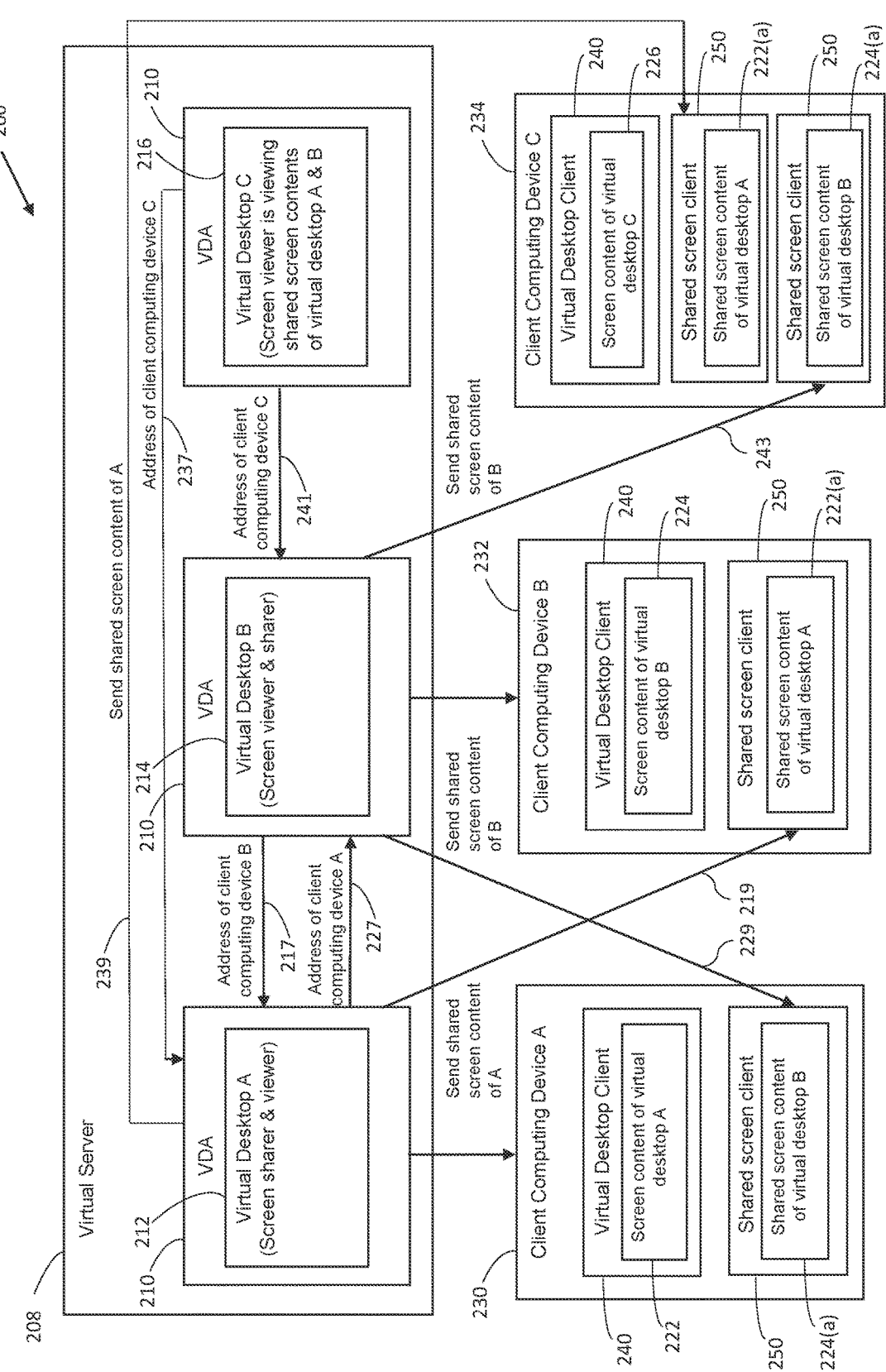
FIG. 10 is a schematic block diagram of the computing system illustrated in FIG. 9 with an additional screen viewer.

Referring now to the computing system 200 in FIG. 10, client computing device C 234 has been added as an additional screen viewer. The steps for adding client computing device C 234 as a screen viewer 304 will apply to any other client computing devices that may be added as screen viewers 304.

Virtual desktop A 212 starts to share its screen as a screen sharer 302. Virtual desktop B 214 accepts the invitation as a screen viewer 304 and provides its endpoint address to virtual desktop A 212 as indicated by line 217. Likewise, virtual desktop C 216 accepts the invitation and provides its endpoint address to virtual desktop A 212 as indicated by line 237. The shared screen content 222(*a*) of virtual desktop A 212 is sent to client computing device B 232 as indicated by line 219, and is sent to client computing device C 234 as indicated by line 239.

Next, virtual desktop B 214 starts to share its screen as a screen sharer 302. Virtual desktop A 212 accepts the invitation as a screen viewer 304 and provides its endpoint address to virtual desktop B 214 as indicated by line 227. Likewise, virtual desktop C 216 accepts the invitation and provides its endpoint address to virtual desktop B 214 as indicated by line 241. The shared screen content 224(*a*) of virtual desktop B 214 is sent to client computing device A 230 as indicated by line 229, and is sent to client computing device C 234 as indicated by line 243. Client computing device C 234 has a respective shared screen client 250 for each shared screen content.

As a result, virtual desktop A 212 is sharing its screen and viewing the shared screen of virtual desktop B 214 without any interference. Virtual desktop B 214 is sharing its screen as well and viewing the shared screen of virtual desktop A 212 without any interference. Virtual desktop C 216 is a viewer that is viewing the shared screens of both virtual desktop A 212 and B 214. Which are separate from Referring now to FIG. 11, a flow diagram 400 for operating the computing system 200 will be discussed. From the start (Block 402), first virtual desktop A 212 and second virtual desktop B 214 are provided by a virtual server 208 at Block 404. Client computing device A 230 accesses virtual desktop A 212 at Block 406. Client computing device A 230 shares content 222(*a*) of virtual desktop A 212 as a screen sharer in a collaboration session at Block 408.

Client computing device B 232 accesses virtual desktop B 214 at Block 410. At client computing device B 232, content 224 of virtual desktop B 214 is displayed in a virtual desktop window at Block 412. Client computing device B 232 participates in the collaboration session as a screen viewer at Block 414. Client computing device B 232 receives the shared screen content 222(*a*) of virtual desktop A 212 at Block 416. Client computing device B 232 displays the shared screen content 222(*a*) in a shared screen window at Block 418, with the shared screen window being separate from the virtual desktop window. The method ends at Block 420.

Figure 11:
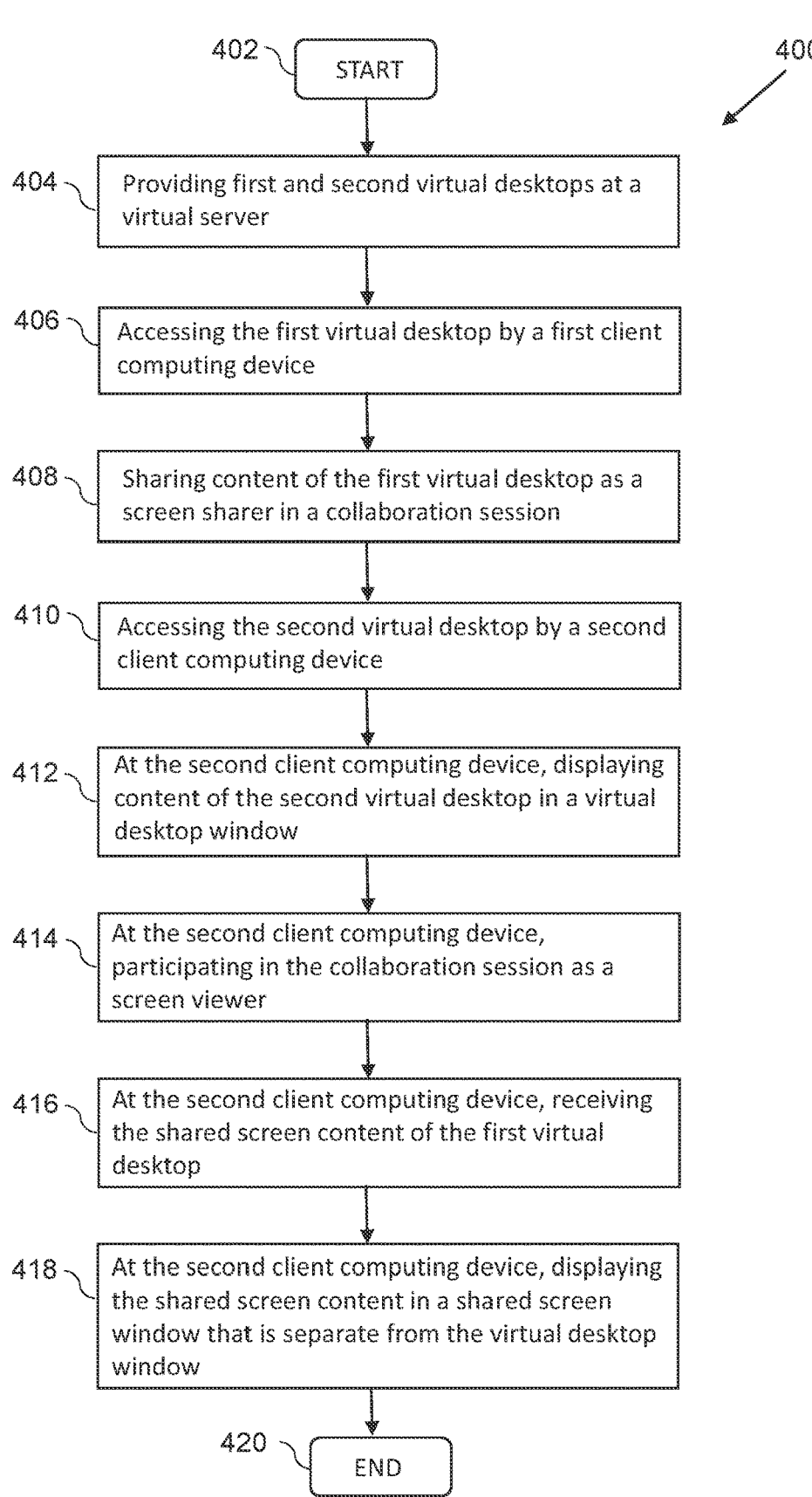
FIG. 11 is a flow diagram on operating the computing system illustrated in FIG. 7.
Figure 12:
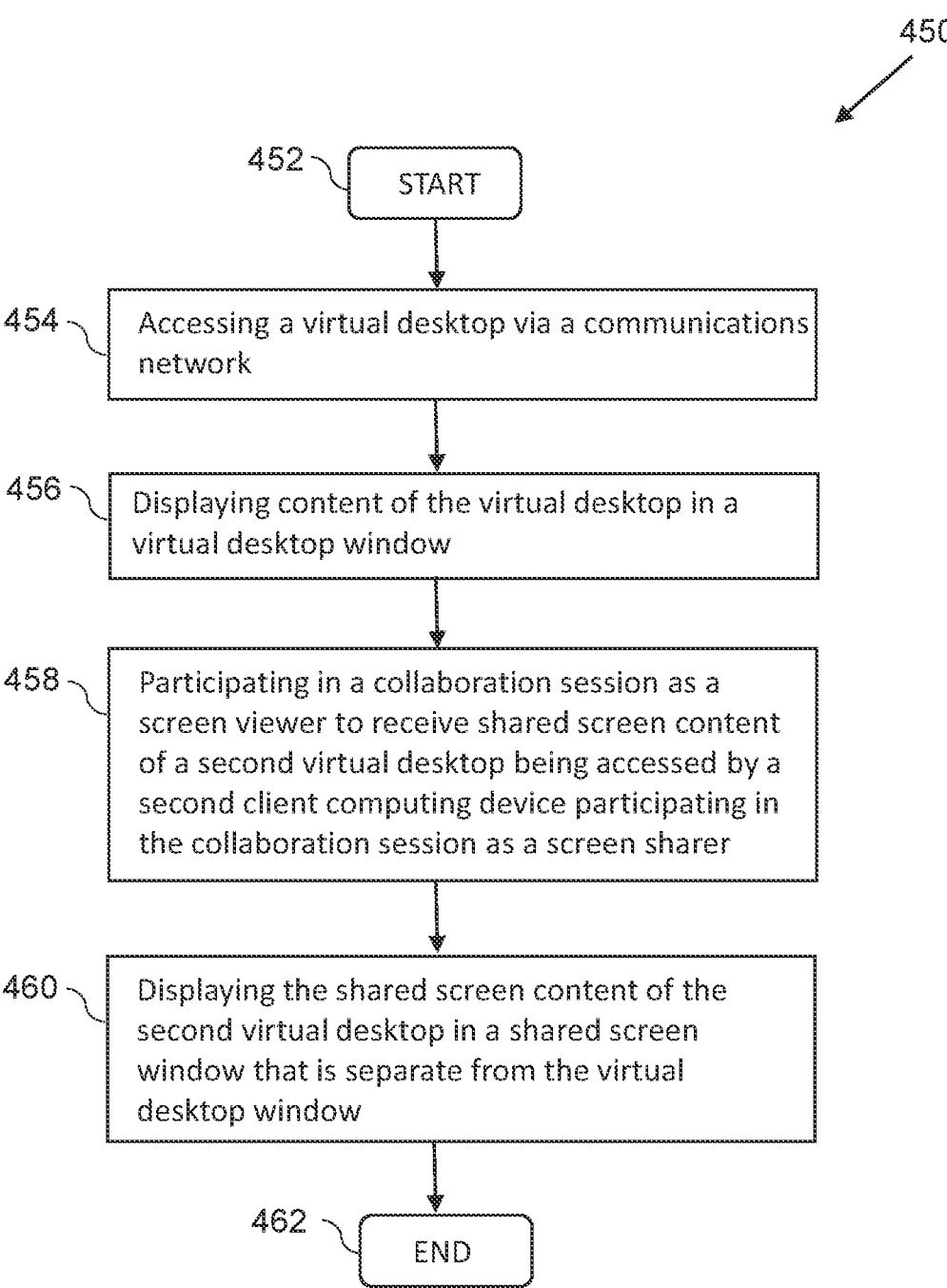
FIG. 12 is a flow diagram on operating one of the client computing devices within the computing system illustrated in FIG. 7.

Referring now to FIG. 11, a flow diagram 450 for operating client computing device B 232 in the computing system 200 will be discussed. From the start (Block 452), client computing device B 232 accesses virtual desktop B 214 via a communications network at Block 454. Content 224 of virtual desktop B 214 is displayed in a virtual desktop window at Block 456.

At Block 458, client computing device B 232 participates in a collaboration session as a screen viewer in order to receive shared screen content 222(*a*) of virtual desktop A 212 being accessed by client computing device A 230 participating in the collaboration session as a screen sharer. The shared screen content 222(*a*) of virtual desktop A 212 is displayed in a shared screen window at Block 460. The shared screen window is separate from the virtual desktop window. The method ends at Block 462.

Furthermore, other aspects of the virtual server or the client computing devices may take the form of a computer program product stored by one or more computer-readable storage media having computer-readable program code, or instructions, embodied in or on the storage media, for operation thereof. Any suitable computer readable storage media may be utilized, including hard disks, CD-ROMs, optical storage devices, magnetic storage devices, and/or any combination thereof.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

The invention claimed is:

1. A computing system comprising:
a virtual server configured to provide first and second virtual desktops;
a first client computing device configured to access the first virtual desktop via a communications network, and to share content of the first virtual desktop as a screen sharer in a collaboration session; and
a second client computing device configured to access the second virtual desktop via the communications network, and to perform the following:
display content of the second virtual desktop in a virtual desktop window, participate in the collaboration session as a screen viewer, receive the shared screen content of the first virtual desktop, and display the shared screen content in a shared screen window, with the shared screen window being separate from the virtual desktop window;
wherein:
the first virtual desktop is further configured to send an invitation to said second client computing device in response to a user of said first client computing device having selected to be the screen sharer, with the invitation including an address of said first client computing device and an authentication token; and
the second virtual desktop is configured to send a request to the first virtual desktop in response to the received invitation, with the request including an address of said second client computing device and the authentication token.

2. The computing system according to claim 1 wherein the first virtual desktop is configured to bypass the second virtual desktop and provide the shared screen content directly to said second client computing device.

3. The computing system according to claim 1 wherein the first virtual desktop is further configured to compare the authentication code in the request with the authentication code in the invitation, and in response to validation of the authentication code, deliver the shared screen content of the first virtual desktop to said second client computing device.

4. The computing system according to claim 1 wherein said second client computing device is further configured to share content of the second virtual desktop as a screen sharer in the collaboration session while the user of said first client computing device is also the screen sharer.

5. The computing system according to claim 4 wherein said first client computing device is configured to perform the following:
display content of the first virtual desktop in a virtual desktop window; and
display the shared screen content of the second virtual desktop in a shared screen window, with the shared screen window being separate from the virtual desktop window.

6. The computing system according to claim 4 wherein the second virtual desktop is configured to bypass the first virtual desktop and provide the shared screen content of the second virtual desktop directly to said first client computing device.

7. The computing system according to claim 4 wherein the second virtual desktop is further configured to send an invitation to said first client computing device in response to the user of said second client computing device having selected to be the screen sharer, with the invitation including an address of said second client computing device and an authentication token.

8. The computing system according to claim 7 wherein the first virtual desktop is configured to send a request to the second virtual desktop in response to the received invitation, with the request including an address of said first client computing device and the authentication token.

9. The computing system according to claim 8 wherein the second virtual desktop is further configured to compare the authentication code in the request with the authentication code in the invitation, and in response to validation of the authentication code, deliver the shared screen content of the second virtual desktop to said first client computing device.

10. The computing system according to claim 4 further comprising a third client computing device configured to access a third virtual desktop from said virtual server via the communication network, and to perform the following:
display content of the third virtual desktop in a virtual desktop window;
participate in the collaboration session as a screen viewer;
receive the shared screen content of the first virtual desktop, and the shared screen content of the second virtual desktop; and
display the shared screen content of the first and second virtual desktops in separate shared screen windows, with each of the shared screen windows being separate from the virtual desktop window.

11. A client computing device comprising:
a display; and
a processor coupled to said display and configured to perform the following:
access a virtual desktop via a communications network, display content of the virtual desktop in a virtual desktop window, participate in a collaboration session as a screen viewer in order to receive shared screen content of a second virtual desktop being accessed by a second client computing device participating in the collaboration session as a screen sharer, and display the shared screen content of the second virtual desktop in a shared screen window, with the shared screen window being separate from the virtual desktop window;
wherein:
said processor is further configured to receive an invitation from the second virtual desktop in response to a user of the second client computing device having selected to be the screen sharer, with the invitation including an address of the second client computing device and an authentication token; and
said processor is further configured to send a request to the second virtual desktop in response to the received invitation, with the request including an address of the client computing device and the authentication token.

12. The client computing device according to claim 11 wherein said processor receives the shared screen content directly from the second virtual desktop.

13. The client computing device according to claim 11 wherein said processor receives the shared screen content of the second virtual desktop in response to validation of the authentication token by the second client computing device.

14. The client computing device according to claim 11 wherein said processor is further configured to share content of the virtual desktop as a screen sharer in the collaboration session while a user of the second client computing device is also the screen sharer.

15. A computing system comprising:

a virtual server configured to provide first and second virtual desktops;

a first client computing device configured to access the first virtual desktop via a communications network, and to share content of the first virtual desktop as a screen sharer in a collaboration session; and a second client computing device configured to access the second virtual desktop via the communications network, and to perform the following:

display content of the second virtual desktop in a virtual desktop window, participate in the collaboration session as a screen viewer, receive the shared screen content of the first virtual desktop, and display the shared screen content in a shared screen window, with the shared screen window being separate from the virtual desktop window;

wherein:

the second client computing device is further configured to share content of the second virtual desktop as a screen sharer in the collaboration session while the user of said first client computing device is also the screen sharer;

the second virtual desktop is further configured to send an invitation to said first client computing device in response to the user of said second client computing device having selected to be the screen sharer, with the invitation including an address of said second client computing device and an authentication token; and the first virtual desktop is configured to send a request to the second virtual desktop in response to the received invitation, with the request including an address of said first client computing device and the authentication token.

16. The computing system according to claim 15 wherein the second virtual desktop is further configured to compare the authentication code in the request with the authentication code in the invitation, and in response to validation of the authentication code, deliver the shared screen content of the second virtual desktop to said first client computing device.

* * * * *